(12) United States Patent
Janecke et al.

(10) Patent No.: US 6,178,366 B1
(45) Date of Patent: Jan. 23, 2001

(54) METHOD/SYSTEM FOR INITIATING AUTOMATIC UPSHIFTING IN AN AUTOMATED MECHANICAL TRANSMISSION SYSTEM

(75) Inventors: Daniel P. Janecke, Kalamazoo; Thomas A. Genise, Dearborn; Eric J. Von Oeyen, Southfield, all of MI (US)

(73) Assignee: Eaton Corporation, Cleveland, OH (US)

( * ) Notice: Under 35 U.S.C. 154(b), the term of this patent shall be extended for 0 days.

(21) Appl. No.: 09/356,743

(22) Filed: Jul. 19, 1999

(51) Int. Cl.[7] .................................................. B60K 41/08
(52) U.S. Cl. .............................. 701/51; 701/55; 477/78
(58) Field of Search .............................. 701/51, 52, 54, 701/55, 62, 64; 477/78, 107, 115

(56) References Cited

U.S. PATENT DOCUMENTS

| | | | |
|---|---|---|---|
| 4,361,060 | 11/1982 | Smyth | 74/866 |
| 4,551,802 | 11/1985 | Smyth | 364/424.1 |
| 4,595,986 | 6/1986 | Daubenspeck et al. | 364/424.1 |
| 4,852,006 | 7/1989 | Speranza | 364/424.1 |
| 4,916,979 | 4/1990 | Irwin | 74/866 |
| 5,053,963 | 10/1991 | Mack | 364/424.1 |
| 5,406,861 | 4/1995 | Steeby | 74/336 |
| 5,409,432 | 4/1995 | Steeby | 477/71 |
| 5,582,558 | 12/1996 | Palmeri et al. | 477/109 |
| 5,989,155 | * 11/1999 | Wadas et al. | 477/111 |

\* cited by examiner

*Primary Examiner*—Tan Nguyen
(74) *Attorney, Agent, or Firm*—Howard D. Gordon

(57) ABSTRACT

A control system/method to initiate upshifts in an automated mechanical transmission system (12). Upshifts are normally initiated on the basis of sensed throttle position (THL) or demand. In certain situation upshifts are initiated on the basis of sensed or calculated engine torque.

13 Claims, 3 Drawing Sheets

METHOD/SYSTEM FOR INITIATING AUTOMATIC UPSHIFTING IN AN AUTOMATED MECHANICAL TRANSMISSION SYSTEM

RELATED APPLICATIONS

This application is related to copending U.S. Ser. No. 09/145,316 filed Aug. 31, 1998 pending and assigned to EATON CORPORATION, assignee of this application.

BACKGROUND OF THE INVENTION

1. Field of the Invention

The present invention relates to improved shift logic for an automated vehicular mechanical transmission system. In particular, the present invention relates to a control method/system having logic rules whereby in the automatic shifting mode, upshifts are initiated normally as a function of throttle position (demand) but, under certain conditions, are initiated as a function of engine torque and not of throttle position (demand).

2. Description of the Prior Art

Fully and partially automated vehicular mechanical transmission systems are known in the prior art, as may be seen by reference to U.S. Pat. Nos. 4,361,060; 4,595,986; 4,648,290; 4,850,236; 5,109,721; 5,393,276; 5,409,432 and 5,425,284, the disclosures of which are incorporated herein by reference. Such transmissions having an automatic shift mode typically base shift decisions upon shift point profiles or shift schedules, which often are graphically represented on a graph of throttle position (demand) versus engine, output shaft or vehicle speed. It is known to temporarily modify these shift profiles in view of various sensed vehicle operating conditions to modify vehicle performance, for antihunt purposes or the like. Examples of such shift logic may be seen by reference to U.S. Pat. Nos. 4,361,060; 4,551,802; 4,852,006; 4,916,979; 5,053,963 and 5,406,861, the disclosures of which are incorporated herein by reference.

While the prior art systems which based upshift decisions on demand usually responded to the driver's intent in most situations, a problem not addressed by the prior art shift logic involves systems which will cause engine torque to be significantly restricted, regardless of throttle position, under certain operating conditions. These systems include all-speed governors, road-speed governors (when maximum ground speed is being approached), gear-down protection, etc. When these systems are active to significantly restrict engine torque regardless of a relative high throttle position, basing upshift decisions on demand will delay upshifting, usually in opposition to the driver's intent.

SUMMARY OF THE INVENTION

In accordance with the present invention, a new and improved automated change-gear shift control, including improved upshift initiation control logic, is provided.

This is accomplished by providing logic rules whereby, under at least certain operating conditions, the normally utilized, demand-based upshift schedule is replaced by an engine torque-based upshift schedule. By way of example, if the actual torque being developed by the engine is less than of predetermined percentage (such as, for example, 25–50%) of the torque being requested by the throttle position, then upshift initiation decisions will be based on engine torque rather than on demand.

Accordingly, it is an object of the present invention to provide a new and improved automated change-gear transmission shift control system/method.

This and other objects and advantages of the present invention will become apparent from a reading of the following description of the preferred embodiment taken in connection with the attached drawings.

DESCRIPTION OF THE PREFERRED EMBODIMENT

Figure 1:
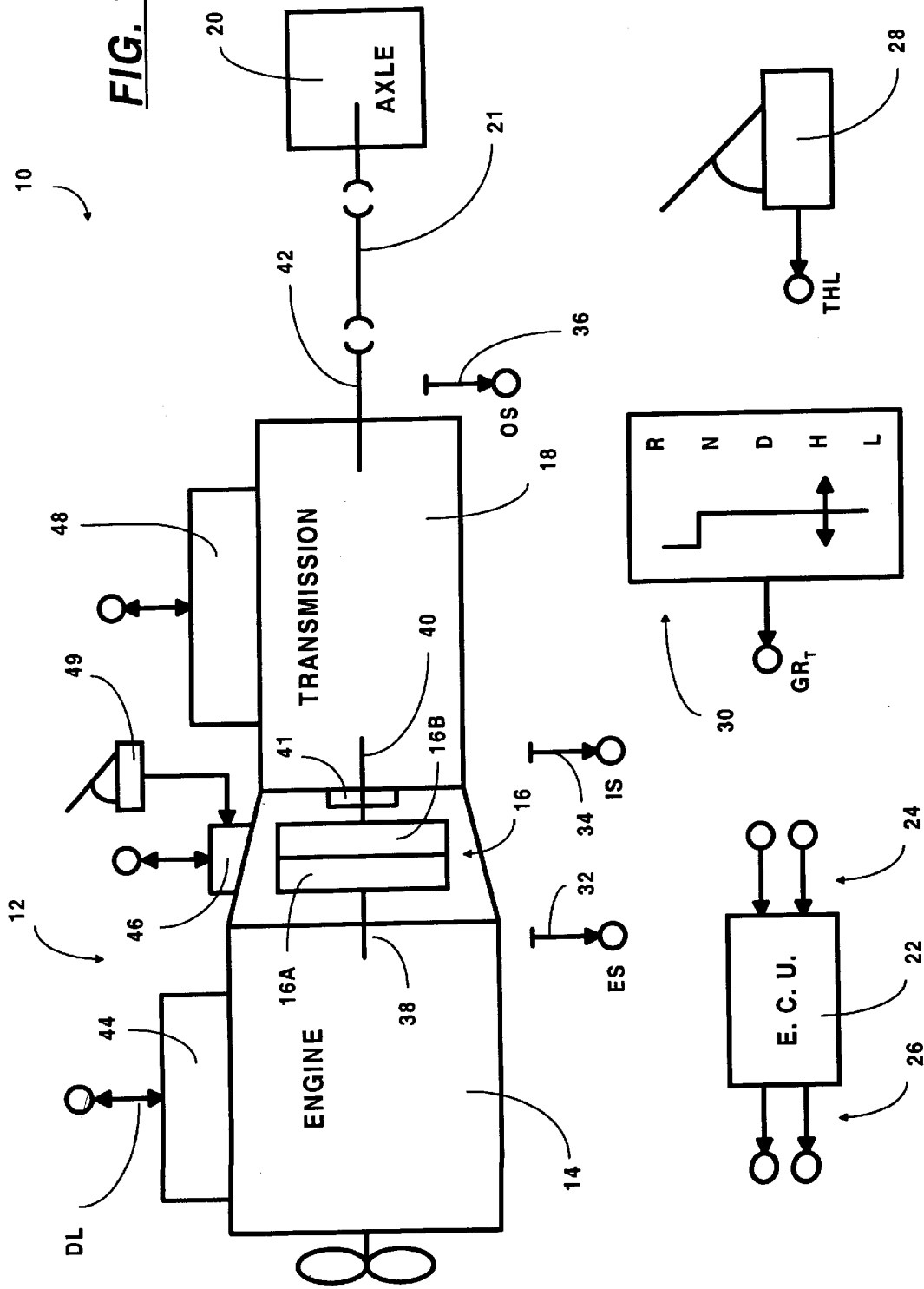
FIG. 1 is a schematic illustration of an at least partially automated vehicular mechanical transmission system utilizing the control logic of the present invention.

FIG. 1 illustrates a vehicle powertrain 10 including an at least partially automated mechanical transmission system 12 utilizing the upshift control logic of the present invention. Powertrain 10 includes an internal combustion engine 14 (such as a gasoline or diesel engine), a master clutch 16 having an input 16A member and an output 16B member, a mechanical transmission 18, and a drive axle assembly 20 driven by propeller shaft 21. While the present invention is particularly well suited for medium- and heavy-duty vehicles, it is not so limited.

Transmission 18 may be of a standard 5-, 6-, 7-, 9-, 10-, 12-, 18- or greater forward speed design. Examples of such transmissions may be seen by reference to U.S. Pats. No. 4,373,403; 4,754,665; and 5,390,561, the disclosures of which are incorporated herein by reference.

The automated transmission system 12 preferably will include microprocessor-based controller 22 for receiving various input signals 24 and processing same according to logic rules to issue command output signals 26 to various system actuators. Controllers of this type are known, as may be seen by reference to aforementioned U.S. Pat. Nos. 4,361,060 and 4,595,986.

A throttle position sensor 28 provides a signal THL indicative of operator-set throttle position or demand level, a shift selector 30 provides a signal GRS indicative of selected transmission operating mode and/or of a request for an up- or downshift for a currently engaged ratio, speed sensors 32, 34 and 36 provide signals ES, IS and OS, respectively, indicative of the rotational speed of the engine crank shaft 38, the transmission input shaft 40 and the transmission output shaft 42, respectively. Preferably, the sensors will sense, or the controller will calculate, a value d/d(THL) indicative of the rate of change with respect to time of throttle pedal position or driver's demand.

An engine controller 44 is provided for controlling speed or torque of the engine, a clutch actuator 46 may be provided for controlling operation of the master clutch, and a transmission operator 48 is provided to control shifting of the transmission. Alternatively, the clutch may be utilized only for starting and stopping the vehicle and may be controlled by a manual clutch pedal 49. An upshift brake 41, preferably under control of ECU 22, also may be provided.

The ECU 22 may be separate or integral with the engine controller 44. The various controllers, sensors and/or actuators may communicate over a data bus conforming to an industry standard protocol, such as SAE J-1939 or the like.

Suitable sensors and actuators are known to those of ordinary skill in the art and examples thereof, not intended to be limiting, may be seen by reference to U.S. Pat. Nos.

4,361,060; 4,873,881; 4,974,468; 5,135,218; 5,279,172; 5,305,240; 5,323,669; 5,408,898; 5,441,137, 5,445,126; 5,448,483 and 5,481,170.

Figure 2:
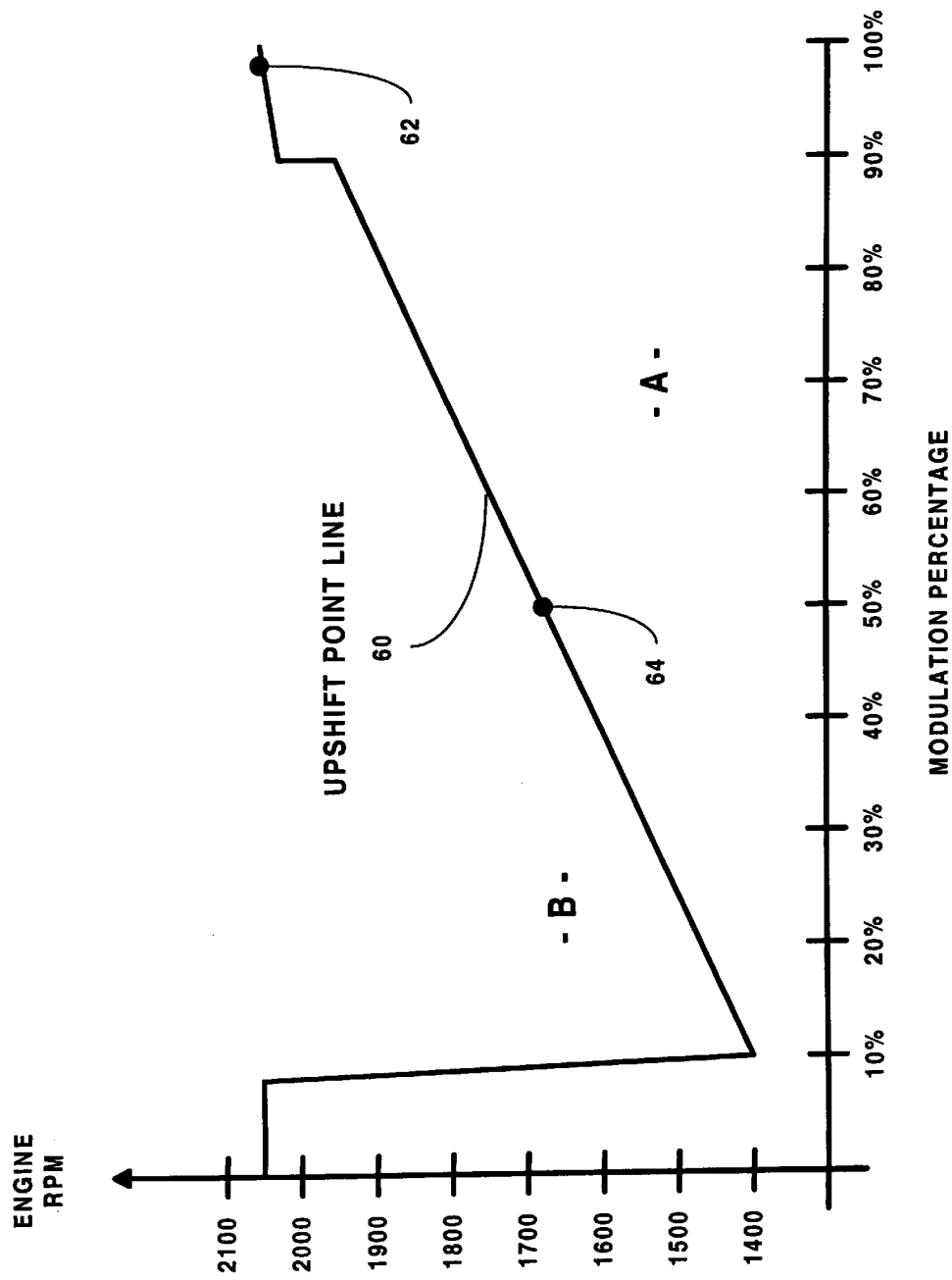
FIG. 2 is a schematic illustration, in graphical format, of a traditional shift schedule.

As is known, in automated transmission systems of this type, when operating in an automatic shifting mode (such as, for a non-limiting example, "D" on selector 30), upshifts and downshifts are commanded according to a "shift schedule" or "shift point profile," a typical version of which is illustrated in FIG. 2. Shift schedules, or the functional equivalents thereof, typically are stored in the memories of the controllers 22. The present invention also is applicable to those transmission systems wherein only the upper ratios are automated.

FIG. 2 is a typical upshift shift point profile for a heavy-duty vehicle having a diesel engine governed to 2100 RPM and a 10-to- 12-forward-speed mechanical transmission. In the prior art, throttle position, also referred to as driver demand, is plotted on the horizontal axis against a speed (such as output shaft or, usually, engine rotational speed) on the vertical axis. Line 60 is the upshift point profile and divides the chart into two operating areas, area A where no upshift is required, and area B where upshifts are required. According to the upshift logic, crossing of line 60 from area A to area B will result in an upshift (single or multiple) being commanded.

In the prior art, the demand is expressed as a throttle pedal position in percentage of displacement from non-displaced to fully displace. The percentage also may be a related value calculated from the data link (DL), such as the "Driver Demand Engine Percent Torque" available on SAW J-1939 data links or the like.

The prior art used demand-based shift point algorithms, as such logic normally provides good correlation to driver (or cruise control) intentions. However, with certain types of engine controls, such as all-speed governors, road-speed governors and gear-down protection devices, the torque actually supplied by the engine may be considerably less than the torque demanded by the throttle position. In such cases, basing upshift decisions on throttle position (i.e., demand) will result in delayed upshifting which is likely to be contrary to the driver's intentions.

Accordingly, if the actual engine torque (a parameter such as gross engine torque or flywheel torque, see U.S. Pat. No. 5,582,069) to considerably less than the torque associated with the driver's demand, this is an indication that a system is actually ramping back torque independently of the throttle pedal position (THL).

According to the present invention, upon sensing that engine torque is substantially limited (for example, if actual engine torque/demanded torque is less than a reference value (REF equal to about 20–50%)), then upshift points will be based upon the actual engine torque.

For example, referring to FIG. 2, if the operator has full throttle displacement but the engine is being limited to 50% of its maximum torque at a given engine speed, using demand-based upshift logic will result in an upshift point at about 62, while using a torque-based upshift logic will result in an upshift point at about 64.

Switching to torque-modulated upshift logic also require that transmission input shaft speed (IS) be somewhat less (for example, at least 50 RPM less) than the rated engine speed (2100 RPM).

Figure 3:
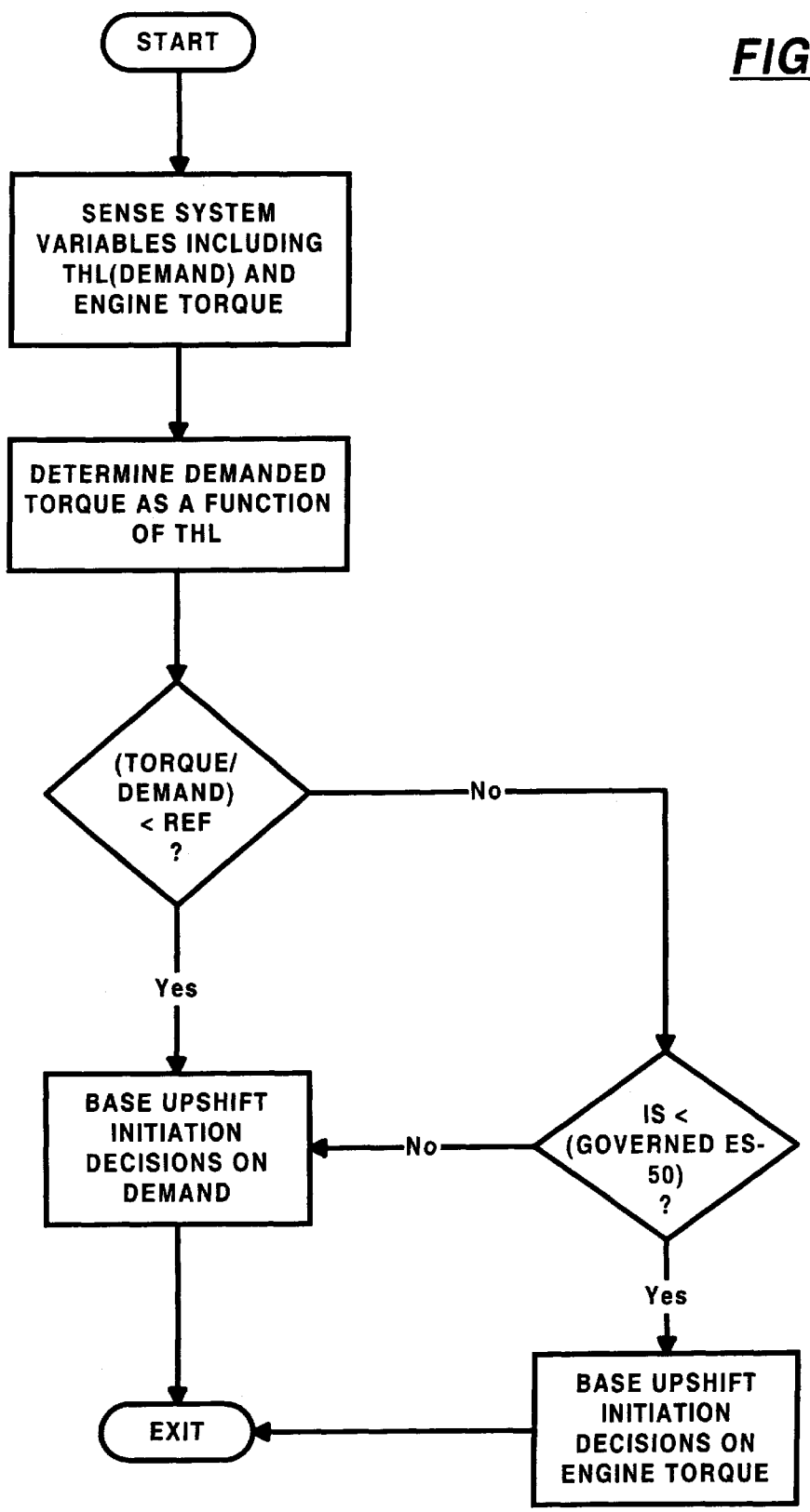
FIG. 3 is a schematic illustration, in flow chart format, of the upshift control logic of the present invention.

FIG. 3 is a flow chart representation of the shift logic modification of the present invention.

Accordingly, it may be seen that a new and improved control system/method for upshifting has been provided.

Although the present invention has been described with a certain degree of particularity, it is understood that the description of the preferred embodiment is by way of example only and that numerous changes to form and detail are possible without departing from the spirit and scope of the invention as hereinafter claimed.

We claim:

1. A method for controlling upshifting in a vehicular automated mechanical transmission system comprising a fuel-controlled engine, a manually controlled device for providing a signal indicative of requested engine fueling, and a change-gear transmission having an input shaft driven by said engine and an output shaft, said transmission having a plurality of selectable ratios of input shaft rotational speed to output shaft rotational speed, a controller for receiving a plurality of input signals including (i) a first input signal indicative of the rotational speed of at least one of said engine input shaft and output shaft, (ii) a second input signal indicative of operator's requested engine fueling, and (iii) a third input signal indicative of torque currently developed by said engine, and for processing said signals in accordance with logic rules to issue command output signals to system actuators, said logic rules having a default mode wherein upshift are commanded if, at given sensed value of said second signal, said first signal exceeds an upshift reference value for said given value of said second signal said method comprising:

determining a demanded torque value corresponding to the value of said second signal, comparing the value of said third input signal to said demanded torque value, and if said demanded torque value exceeds the value of said third signal by greater than a predetermined amount, causing said logic to operate in an alternate mode of operation wherein upshifts are commanded if, at a given sensed value of said third input signal, said first signal exceeds an upshift reference value for said given value of said third signal.

2. The method of claim 1 wherein said engine has a governed maximum speed, said input signals include a signal indicative of the rotational speed of said input shaft, and operating in said alternative mode of operation requires that input shaft speed be less than said governed maximum speed.

3. The method of claim 2 wherein said governed speed must exceed said input shaft speed by at least 50 RPM for operation in said alternative mode of operation.

4. The method of claim 1 wherein the quotient of said third signal divided by said demanded torque value must be less than 0.50 ((engine torque/demanded torque) <50%?) for operation in said alternative mode of operation.

5. The method of claim 2 wherein the quotient of said third signal divided by said demanded torque value must be less than 0.50 ((engine torque/demanded torque) <50%?) for operation in said alternative mode of operation.

6. The method of claim 1 wherein said controller is microprocessor-based.

7. The method of claim 1 wherein said first signal is indicative of engine rotational speed.

8. The method of claim 1 wherein said first, second and third input signals are read by said controller from an electronic data link.

9. A control system for controlling upshifting in a vehicular automated mechanical transmission system (12) comprising a fuel-controlled engine (14), a manually controlled device for providing a signal indicative of requested engine fueling (28), and a change-gear transmission (18) having an input shaft (40) driven by said engine and an output shaft (42), said transmission having a plurality of selectable ratios of input shaft rotational speed to output shaft rotational speed, a controller (22) for receive a plurality of input signals (24) including (i) a first input signal (ES, IS, OS) indicative of the rotational speed of at least one of said engine, input shaft and output shaft, (ii) a second input signal (THL) indicative of the operator's requested engine fueling, and (iii) a third input signal indicative of torque currently developed by said engine, and for processing said signals in accordance with logic rules to issue command output signals (26) to system actuators (44, 46 and/or 48), said logic rules in a default mode of operation causing an upshift to be commanded if at given sensed value of said second signal, said first signal exceeds an upshift reference value for said given value of said second signal, said control system characterized by said logic rules including rules for:

determining a demanded torque value corresponding to the value of said second signal, comparing the value of said third input signal to said demanded torque value, and if said demanded torque value exceeds the value of said third input signal by greater than a predetermined amount, causing said logic to operate in an alternate mode of operation wherein upshifts are commanded if, at a given sensed value of said third input signal, said first signal exceeds an upshift reference value for said given value of said third signal.

10. The system of claim 9 wherein said engine has a governed maximum speed, said input signals include a signal indicative of the rotational speed of said input shaft, and operating in said alternative mode of operation requires that input shaft speed be less than said governed maximum speed.

11. The system of claim 10 wherein said governed speed must exceed said input shaft speed by at least 50 RPM for operation in said alternative mode of operation.

12. The system of claim 10 wherein the quotient of said third signal divided by said demanded torque value must be less than 0.50 ((engine torque/demanded torque) <50%?) for operation in said alternative mode of operation.

13. The system of claim 9 wherein the quotient of said third signal divided by said demanded torque value must be less than 0.50 ((engine torque/demanded torque) <50%?) for operation in said alternative mode of operation.

\* \* \* \* \*